US010730029B2

(12) United States Patent
Ganan-Calvo et al.

(10) Patent No.: US 10,730,029 B2
(45) Date of Patent: Aug. 4, 2020

(54) CONCENTRIC CAPILLARY MICROENCAPSULATION DEVICES AND METHODS

(71) Applicants: INGENIATRICS TECNOLOGIAS, S.L., Seville (ES); UNIVERSIDAD DE SEVILLA, Seville (ES)

(72) Inventors: Alfonso Miguel Ganan-Calvo, Seville (ES); Inmaculada Munoz, Seville (ES); Jeronimo Escudero, Seville (ES); Gloria Jurado, Seville (ES); Antonio Serrano, Seville (ES); Sandra Velazquez, Seville (ES); Maria Flores Mosquera, Seville (ES)

(73) Assignees: INGENIATRICS TECNOLOGIAS, S.L., Seville (ES); UNIVERSIDAD DE SEVILLA, Seville (ES)

( * ) Notice: Subject to any disclaimer, the term of this patent is extended or adjusted under 35 U.S.C. 154(b) by 235 days.

(21) Appl. No.: 15/761,020

(22) PCT Filed: Sep. 28, 2016

(86) PCT No.: PCT/IB2016/055804
§ 371 (c)(1),
(2) Date: Mar. 16, 2018

(87) PCT Pub. No.: WO2017/056019
PCT Pub. Date: Apr. 6, 2017

(65) Prior Publication Data
US 2018/0272306 A1   Sep. 27, 2018

(51) Int. Cl.
*B01J 13/04* (2006.01)
(52) U.S. Cl.
CPC ..................... *B01J 13/04* (2013.01)
(58) Field of Classification Search
CPC .................. B01J 13/04; B05B 1/061
See application file for complete search history.

(56) References Cited

U.S. PATENT DOCUMENTS

| 6,248,378 B1 | 6/2001 | Ganan-Calvo |
| 6,357,670 B2 | 3/2002 | Ganan-Calvo |
| 6,450,189 B1 | 9/2002 | Ganan-Calvo |
| 2009/0215154 A1* | 8/2009 | Ganan Calvo ....... A61K 9/5138 435/252.33 |

FOREIGN PATENT DOCUMENTS

| WO | 9930833 A1 | 6/1999 |
| WO | 9930835 A1 | 6/1999 |
| WO | 9931019 A1 | 6/1999 |

OTHER PUBLICATIONS

Martin-Banderas et al., "Flow Focusing: A Versatile Technology to Produce Size-Controlled and Specific-Morphology Microparticles"; Particle preparation; 2005; pp. 688-692; No. 7; Wiley-VCH Verlag GmbH & Co.

Ganan-Calvo et al.; "Building functional materials for health care and pharmacy from microfluidic principles and Flow Focusing"; Advanced Drug Delivery Reviews; 2013; pp. 1447-1469; Elsevier B.V.

Herrada et al., "Liquid flow-focused by a gas: jetting, dripping, and recirculation"; arxiv.org, Cornell University Library, 201 Olin Library Cornell University Ithaca, NY 14853; Apr. 19, 2008.

\* cited by examiner

*Primary Examiner* — Irina S Zemel
(74) *Attorney, Agent, or Firm* — Hayes Soloway PC

(57) ABSTRACT

Concentric flow focusing encapsulation devices and methods for production of microencapsulated droplets of a first core material surrounded by a second shell material include assessment of non-dimensional fluid dynamic parameters that are related to the characteristics of produced droplets. The parameters are specifically related to characteristics such as homogenous or non-homogenous modes of concentric droplet breakup, density distribution of various droplet sizes, and qualities such as monodispersity of droplets produced. By identifying control parameters in specific regions, control variables may be selected to produce droplets or particles with desired qualities.

15 Claims, 13 Drawing Sheets

| Example | Internal solution | Qint (mL/h) | External solution | Qext (mL/h) | P (mbar) | $Re_2We_1^{1/4}$ | $Re_1^2Re_2$ | $Re_2We_2$ | $Re_2We_2/We_2$ | VMD (µm) | GSD |
|---|---|---|---|---|---|---|---|---|---|---|---|
| A | Essential oil | 0,25 | CG iotta 0.25%+ Algogel 1.25% + MC 0.5% | 2 | 100 | 0,08 | 0,74 | 0,14 | 0,13 | 67,9 | 1,4 |
| C | Essential oil | 0,03 | CG iotta 0.25%+ Algogel 0.75% + MC 0.5% | 4 | 70 | 1,24 | 1,53 | 2,90 | 0,67 | 61,6 | 1,6 |
| D | Essential oil | 0,1 | CG iotta 0.25%+ Algogel 0.75% + MC 0.5% | 4 | 70 | 1,45 | 5,16 | 2,95 | 1,22 | 73,9 | 1,5 |
| E | Essential oil | 0,25 | CG iotta 0.25%+ Algogel 1.25% + MC 0.5% | 50 | 100 | 0,40 | 3,49 | 3,10 | 0,13 | 184,5 | 2,3 |
| F | Essential oil | 0,25 | GC iotta 0.25%+ Algogel 0.75%+ MC0.5%+Aerosil 2.5% | 50 | 90 | 1,40 | 11,33 | 9,79 | 0,53 | 77,6 | 1,8 |
| G | Essential oil | 0,25 | GC iotta 0.25%+ Algogel 0.75%+ MC 0.5% | 30 | 70 | 4,43 | 35,02 | 21,77 | 1,93 | 117,5 | 1,25 |
| H | Essential oil | 0,25 | GC iotta 0.25%+ Algogel 0.75%+ MC 0.5% | 5 | 50 | 1,59 | 11,34 | 2,70 | 1,78 | 104,5 | 1,23 |
| I | High content omega 3 Oil | 1 | SUR15% HPMC 0.1% | 30 | 70 | 22,21 | 1,08 | 98,67 | 40,25 | 88,7 | 1,24 |

FIG. 7

| MAPPED REGION | CONCENTRIC DROPLET BREAKUP | EXAMPLE |
|---|---|---|
| $Re_2 We_1^{0.25} < 1.2$ | Non-homogeneous | A, E |
| $Re_1^2 Re_1 < 10$ and $Re_2 We_2 < 3$ | Non-homogeneous | A, C, D |
| $Re_2 We_1 / We_2 < 1$ | Non-homogeneous | F |
| $Re_2 We_1^{0.25} > 1.2$ and $Re_1^2 Re_1 > 10$ $Re_2 We_2 > 3$ and $Re_2 We_1 / We_2 > 1$ | Mainly Homogenous | G |
| $Re_2 We_1^{0.25} > 1.2$ and $Re_1^2 Re_2 > 10$ $Re_2 We_2 < 3$ and $Re_2 We_1 / We_2 > 1$ | Mainly Homogenous | H |
| $Re_2 We_1^{0.25} > 1.2$ and $Re_1^2 Re_2 < 10$ $Re_2 We_2 > 3$ and $Re_2 We_1 / We_2 > 1$ | Mainly Homogenous | I |

FIG. 10

CONCENTRIC CAPILLARY MICROENCAPSULATION DEVICES AND METHODS

TECHNICAL FIELD

The present disclosure relates generally to devices and methods for producing encapsulated droplets or particles and more particularly to devices and methods for producing a plurality of substantially monodisperse droplets or particles of a first core material encapsulated in a second shell material.

BACKGROUND ART

Encapsulated droplets and particles are used in a variety of commercial applications, including but not limited to drug delivery, pharmaceuticals, medical procedures, food products, combustion systems, personal care products, and many other industries. Encapsulated droplets and particles typically include a first core material surrounded by a second shell material, wherein the first core material and second shell material are different. Encapsulated droplets and particles may be formed using a variety of different techniques and devices known in the art. Traditional methods and devices for forming encapsulated droplets and particles generally require mechanically combining the core material and shell material in such a way that the shell material surrounds a particle or droplet of the core material.

One conventional method of producing encapsulated droplets and particles relies on dissociation or breakup of a stable capillary microjet, wherein the microjet includes a center column of core material having a sheath of shell material surrounding the core material. By controlling flow parameters and mechanical properties of both core and shell materials, controlled capillary instability of the microjet may be achieved. Such controlled instability leads to breakup of the microjet into a plurality of encapsulated droplets. This technique of encapsulated droplet formation may be referred to as flow focusing encapsulation or stabilized microjet capillary breakup encapsulation. For example, U.S. Pat. No. 6,357,670 to Ganan-Calvo et al. titled "Stabilized Capillary Microjet and Devices and Methods for Producing Same" teaches devices and methods for production of encapsulated droplets by choosing control variables to achieve a desired capillary microjet flow regime allowing controlled breakup of a capillary microjet into spherical droplets of core material surrounded by a layer of shell material. Ganan-Calvo identifies control variables to include flow parameters (pressure, volumetric flow rate), material properties (density, viscosity), and geometric dimensions (orifice diameter). Such control variables may be selected to influence, inter alia, droplet core diameter, shell thickness, outer diameter, and eccentricity between core and shell. Ganan-Calvo further teaches selection of the control variables to influence the stability of the capillary microjet.

Known techniques and devices for producing such particles that rely on selection of control parameters to influence dispersion characteristics may yield inconsistent results. Conventional studies of flow focusing encapsulation generally focus on selection of parameters to produce a stable microjet, and such studies are not aimed at identifying the parameters that lead to undesirable, or bad, results. For example, conventional methods and devices do not intentionally identify relationships between control parameters that lead to non-homogenous concentric droplet breakup or non-monodisperse droplet production.

What is needed, then are improvements in devices and methods for producing encapsulated droplets and particles.

DISCLOSURE OF THE INVENTION

This Brief Summary is provided to introduce a selection of concepts in a simplified form that are further described below. This Summary is not intended to identify key features or essential features of the claimed subject matter, nor is it intended to be used as an aid in determining the scope of the claimed subject matter.

The present disclosure provides methods and devices for production of encapsulated droplets or particles using concentric flow focusing as an encapsulation and droplet formation technique. The concentric flow focusing technique includes flows of a first material (core), a second material (shell), and a third material (focusing fluid) through an orifice in a pressure chamber. The various materials have material properties and flow properties that combine to form control variables that may be selected to influence fluid dynamic behavior. The parametric space of the numerous control variables may be reduced to non-dimensional control parameters for analysis. The present disclosure provides methods and devices for producing encapsulated droplets by first quantitatively identifying control parameters that lead to undesirable results. The methods include identifying quantitative relationships between selected non-dimensional control parameters that are used to determine the regions in which desirable and undesirable properties are achieved. Based on the identified regions, control variables for droplet production may then be selected to avoid regions where undesirable properties are most likely to be encountered.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 7 is a table showing experimental results for selected concentric flow focusing encapsulation experiments performed in accordance with the present disclosure.

FIG. 10 is a table identifying non-dimensional parameter regimes that lead to different modes of concentric droplet breakup and selected experimental Examples from the table on FIG. 7.

BASIC MODE FOR CARRYING OUT THE INVENTION

Figure 1:
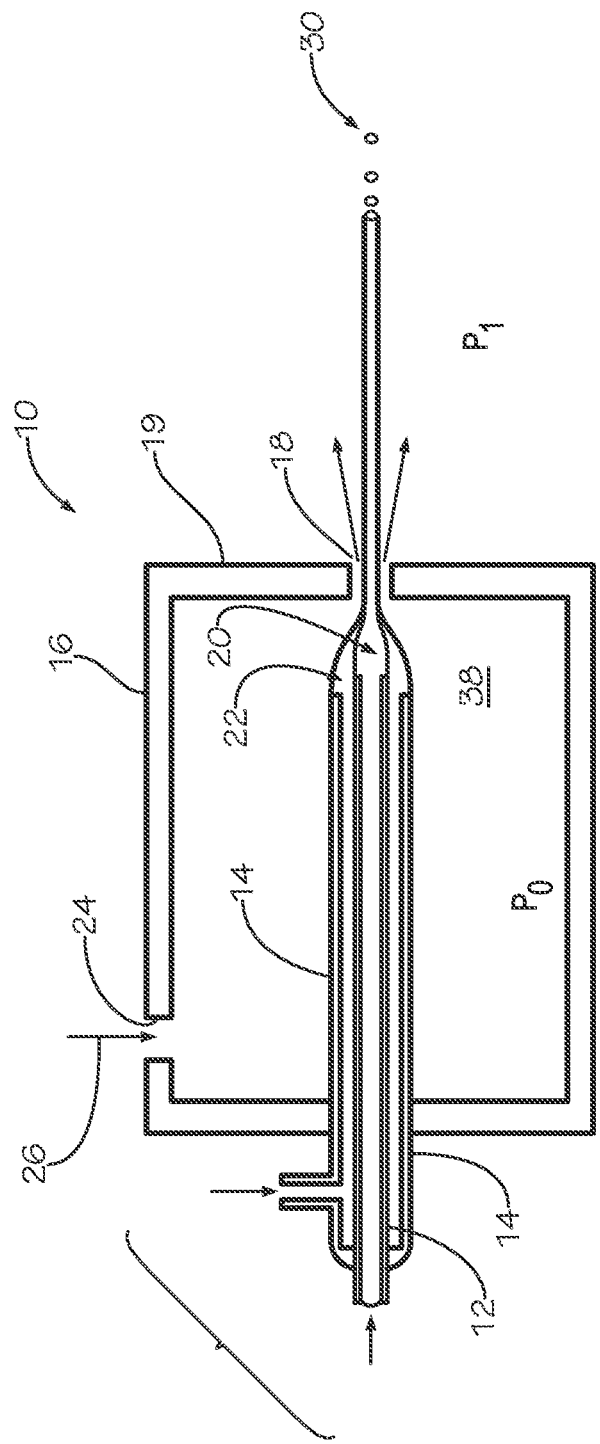
FIG. 1 is a schematic view of an embodiment of a device for producing encapsulated droplets using concentric flow focusing.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Additionally, reference to singular forms such as "a," "and," and "the" as used herein and/or in the Claims may be interpreted to refer to more than one unless the context indicates otherwise. For example, reference to "a particle" or "a droplet" includes reference to a plurality of particles or droplets, and reference to "a fluid" may refer to a mixture or other combination of more than one fluid, and equivalents thereof known in the art.

Flow focusing devices for production of encapsulated droplets and particles in accordance with the present disclosure typically include a first channel for introducing a first material, a second channel for introducing a second material, and a pressure chamber surrounding the first and second channels. The first and second channels each terminate at respective openings upstream of an orifice in the pressure chamber. The first and second channels are arranged substantially concentrically such that the first channel is annularly surrounded by the second channel. In some embodiments, the first and second channels comprise cylindrical or substantially round tubes.

An exemplary embodiment of a flow focusing device 10 for microencapsulation is shown in FIG. 1. Device 10 includes a first channel 12 and a second channel 14. Second channel 14 is positioned concentrically around first channel 12 such that an annular gap is defined between the outer wall of first channel 12 and the inner wall of second channel 14. The annular gap between first and second channels 12, 14 provides a passage for flow of a second material, or shell material, such as a fluid. The interior of first channel 12 provides a passage for flow of a core material such as a fluid.

First channel 12 terminates at a first channel end opening 20, and second channel 14 terminates at a second channel end opening 22. Second channel end opening 22 is positioned concentrically around first channel end opening 20 in some embodiments, and may be axially offset in either axial direction.

A pressure chamber 16 surrounds at least a portion of first and second channels 12, 14 such that first and second channel exit openings 20, 22 are positioned inside of the pressure chamber 16. A fluid such as a liquid or a gas may be introduced into pressure chamber 16 via a pressure chamber input port 24. Pressure chamber 16 also includes a pressure chamber exit orifice 18 defined on a pressure chamber wall 19 located downstream of the first and second channel end openings 20, 22. Fluid introduced to chamber 16 escapes through exit orifice 18. An interior pressure $P_0$ is established inside pressure chamber 16 in some embodiments. An exterior pressure $P_1$ is also established outside of the pressure chamber 16 downstream of exit orifice 18. $P_1$ is less than $P_0$, and a pressure differential between $P_0$ and $P_1$ is established across the exit orifice 18. The pressure differential causes third material to flow from the interior of pressure chamber 16 through exit orifice 18.

Figure 2:
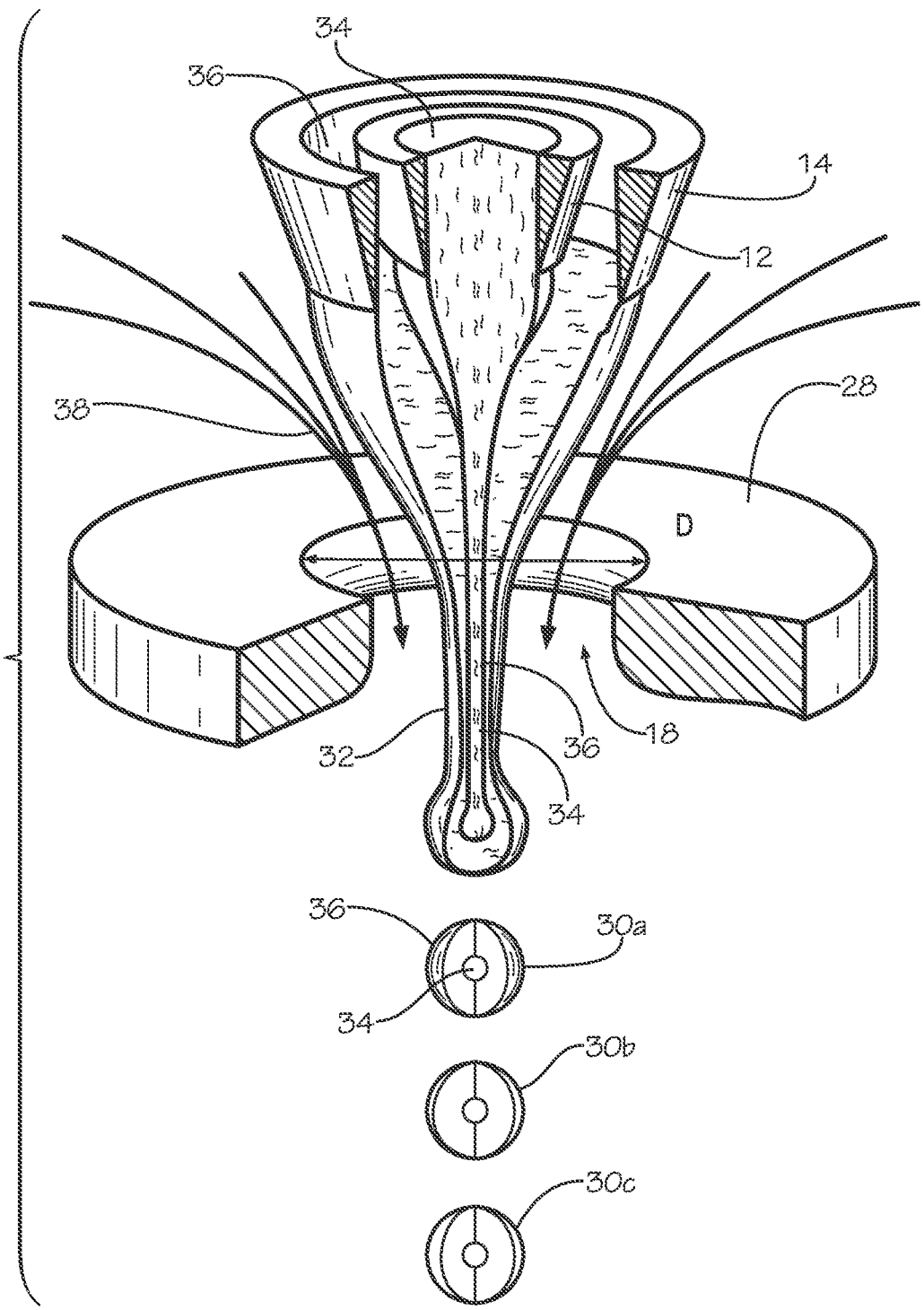
FIG. 2 is a partial cross-sectional view of an embodiment of a device for producing encapsulated droplets using concentric flow focusing.

During flow conditions, as seen in FIG. 2 a first material 34 is introduced through first channel toward first channel exit opening 20, and a second material 36 is introduced through the annular gap between the outer wall of first channel 12 and the inner wall of second channel 14. The first material 34 is ejected from the first channel exit opening 20, and the second material 34 is simultaneously ejected from the second channel exit opening 22. Upon exit, the second material 22 surrounds the first material. A third material 38 such as a liquid or a gas is passed from the interior of pressure chamber 16 through pressure chamber exit orifice 18. The flow of third material 38, i.e. a gas, from the interior of pressure chamber 16 through exit orifice 18 imparts a surface stress on the outer surface of the second material at the second channel exit opening 22. The surface stress imparted by the flow of the third material pulls the second material toward the exit orifice 18, forming a capillary microjet 32 extending from the second channel exit opening 22 toward and through the exit orifice 18 in some embodiments, as seen in FIG. 2. The second material 36 being focused by the microjet 32 also applies an axial stress on the first material emitted from the first channel exit opening 20. The first material 34 emitted from the first channel exit opening is pulled toward the exit orifice 18 by the second material 36. The capillary microjet 32 thus includes an axial core comprising first material 34 emitted from first channel exit opening 20 and a second material 36 forming an axial shell surrounding the core material.

The capillary microjet 32 is focused by the surrounding flow of third material in a liquid or gas state out of orifice 18 to achieve a local microjet diameter smaller than the dimension of the second channel exit opening 22. The local microjet diameter between the second channel exit opening 22 and exit orifice 18 is also smaller than the exit orifice diameter, D. Thus, microjet 32 does not contact the end wall 19 of the pressure chamber 16. Downstream of the exit orifice 16, the microjet 32 breaks up into a series of encapsulated droplets 30a, 30b, 30c, etc. Each encapsulated droplet includes a spherical center of the first material 34 (or core material) and a spherical shell or coating of the second material 36 (or shell material). Additional mass of first and second material 34, 36 are continuously fed to first and second channels 12, 14 to feed material for the production of the encapsulated droplets.

The present disclosure is directed to methods for selection of control variables to influence the geometric properties of microscale encapsulated droplets and/or particles 30a, 30b, 30c, etc. produced using concentric flow focusing encapsulation. A general model for concentric flow focusing encapsulation of a first material (or core) in a second material (or shell) using a pressurized gas (or focusing fluid) to form a droplet includes at least thirteen physical dimensional variables, including the following:

$$\{\rho_1,\rho_2,\rho_3,\mu_1,\mu_2,\mu_3,\sigma_1,\sigma_2,\sigma_3,Q_1,Q_2,\Delta P,D\}$$

wherein each variable has the following value:
- $\rho_1$: density first material (core)
- $\rho_2$: density second material (shell)
- $\rho_3$: density third material (focusing fluid, gas)
- $\mu_1$: viscosity first material (core)
- $\mu_2$: viscosity second material (shell)
- $\mu_3$: viscosity third material (focusing fluid, gas)
- $\sigma_1$: surface tension between first material (core) and second material (shell)
- $\sigma_2$: surface tension between second material (shell) and third material (focusing fluid, gas)
- $\sigma_3$: surface tension between first material (core) and third material (focusing fluid, gas)
- $Q_1$: Volumetric flow rate first material (core, liquid)
- $Q_2$: Volumetric flow rate second material (shell, liquid)
- $\Delta P$: pressure drop of the third material (focusing fluid, gas) through the exit orifice
- D: pressure chamber exit orifice diameter The number of control variables in the parametrical space for investigating dispersion characteristics of concentric flow focusing encapsulation may be reduced based on certain assumptions associated with the desired flow regime. First, it is known in the art that the diameter of the pressure chamber exit orifice 18 has a negligible influence on dispersion properties for laminar capillary microjet flow. Second, the relative difference in densities of $\rho_1$ and $\rho_2$ is very small compared with the value of the densities themselves, and these values may be approximated as constants. Similarly, the third material 38 introduced through the pressure chamber is typically a gas such as air having a constant density ($\rho_3$).

Modeling of fluid dynamic behavior is typically desired in terms of non-dimensional variables. As part of the present disclosure, dimensional analysis on the remaining control parameters can be reduced to non-dimensional space using six non-dimensional parameters related to non-dimensional Reynolds Number, non-dimensional Weber Number and normalized non-dimensional surface tension. Thus, in non-dimensional space, the relative control variables for modeling concentric flow focusing encapsulation of a first material 34 (core) by a second material 36 (shell) using a third material 38 (focusing fluid, gas) is:

$$\{Re_1,Re_2,We_1,We_2,\sigma_{21},\sigma_{31}\}$$

where each non-dimensional variable has the following definitions:

$$Re_1 = (2/\pi^2)^{1/4}\left(\frac{\rho_1^3 Q_1^2 \Delta P}{\mu_1^4}\right)^{1/4}; \quad Re_2 = (2/\pi^2)^{1/4}\left(\frac{\rho_2^3 (Q_1+Q_2)^2 \Delta P}{\mu_2^4}\right)^{1/4};$$

$$We_1 = (8/\pi^2)^{1/4}\left(\frac{\rho_1 Q_1^2 \Delta P^3}{\sigma_1^4}\right)^{1/4}; \quad We_2 = (8/\pi^2)^{1/4}\left(\frac{\rho_2 (Q_1+Q_2)^2 \Delta P^3}{\sigma_2^4}\right)^{1/4};$$

$$\sigma_{21} = \sigma_2/\sigma_1; \quad \sigma_{31} = \sigma_3/\sigma_1$$

After performing around one-thousand experiments producing encapsulated droplets, it was determined that normalized non-dimensional surface tension $\sigma_{21}$ and $\sigma_{31}$ have negligible discriminatory relevance in affecting desired dispersion characteristics.

Thus, the parametrical space for selecting control variables to influence desired dispersion characteristics for concentric flow focusing encapsulation reduces to a non-dimensional set of control variables:

$$\{Re_1,Re_2,We_1,We_2\}$$

Experiments were performed to create dispersions of microencapsulated droplets to investigate the relationship between the above-referenced set of four control variables and desired monodispersity characteristics of the resultant dispersions. The experimental results were studied using three-dimensional projections with different combinations of control variables from the set of four non-dimensional control parameters. The goal of the experimental procedure and analysis was to determine a relationship between Weber Number and Reynolds Number that can be used to determine what parametrical ranges yield droplets having undesirable properties such as satellites, bad performance, dripping, or other types of faulty performance. Each three-dimensional projection space is divided by an approximate plane to separate data points for experiments yielding undesirable results from those yielding good results.

Figure 4:
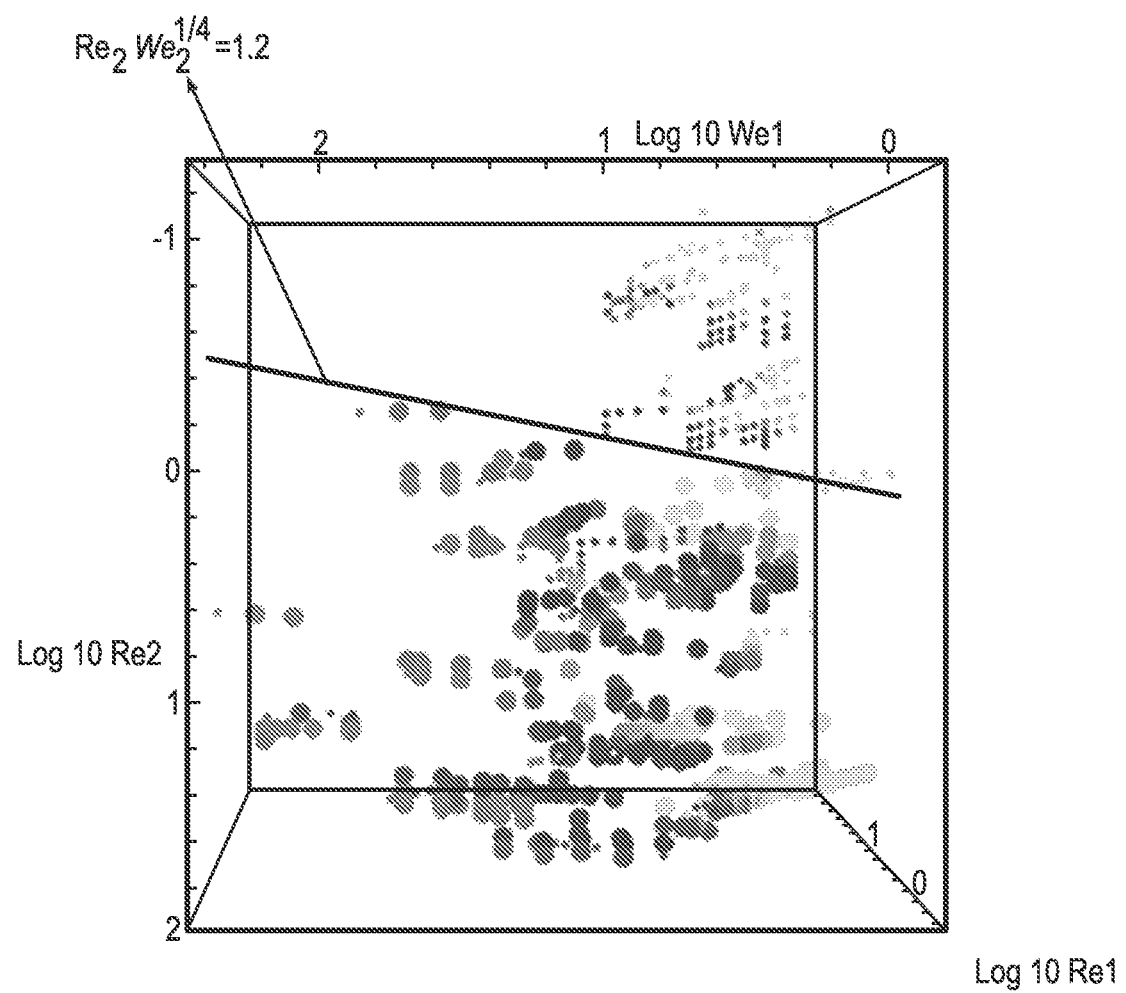
FIG. 4 is a graph showing experimental results mapping relationships between Weber number and Reynolds number in accordance with the present disclosure.

A first projection of the non-dimensional control parameter set $\{Re_1,Re_2,We_1\}$ is shown in FIG. 4. The first projection maps logarithmic scales of non-dimensional variables Log $10We_1$ on the X-axis, Log $10Re_2$ on the Y-axis, and Log $10Re_1$ on the Z-axis. On the first projection, a relationship between Re2 and We1 is identified to separate good results from bad results. The relationship identified in the first projection is that bad results are generally obtained in the region $Re_2 We_1^{1/4} < 1.2$, and good results are generally obtained in the region $Re_2 We_1^{1/4} > 1.2$.

Figure 5:
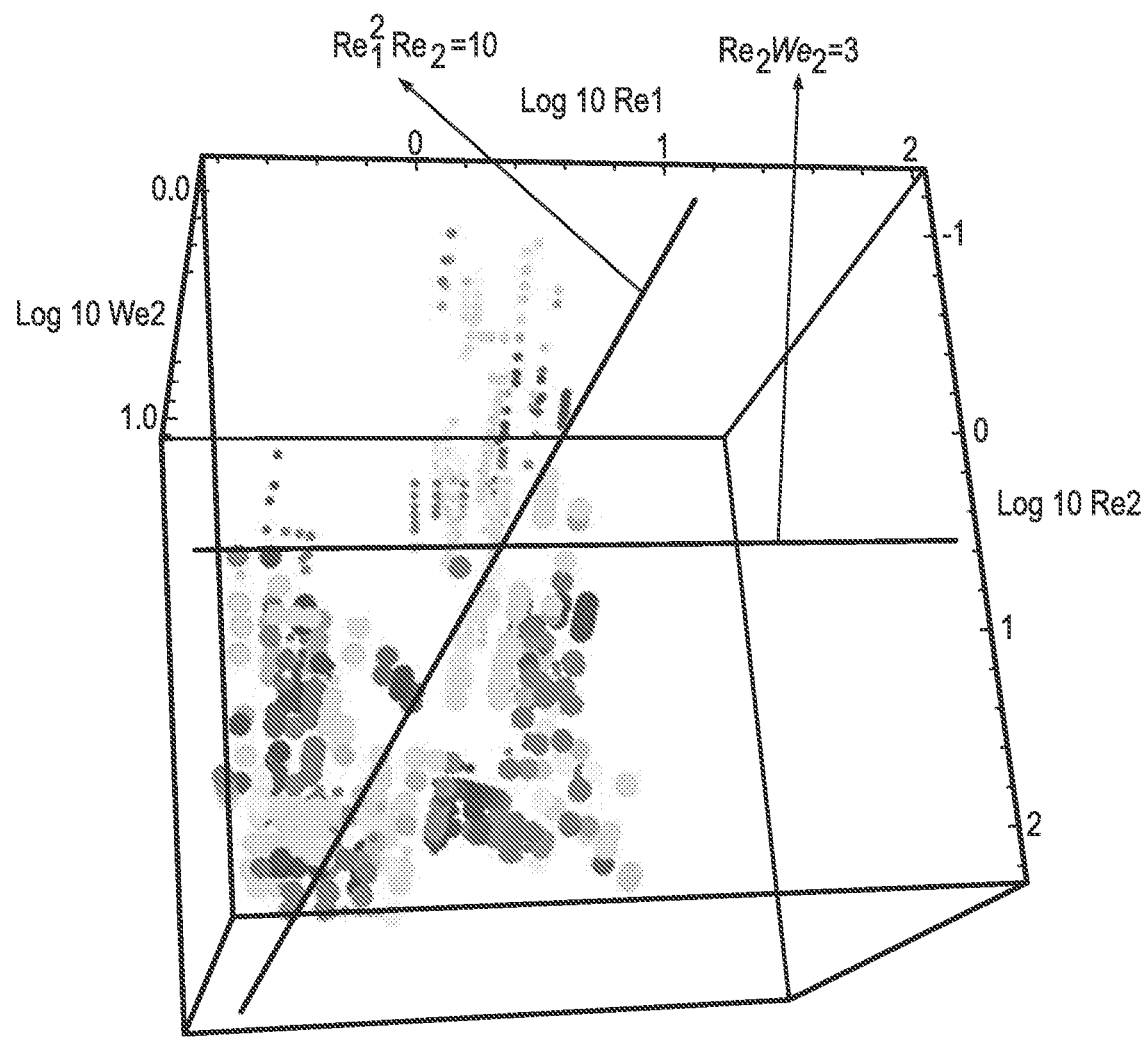
FIG. 5 is a graph showing experimental results mapping relationships between Weber number and Reynolds number in accordance with the present disclosure.

A second projection is shown in FIG. 5. The second projection maps the relationship between the non-dimensional set of control variables including $\{Re_1,Re_2,We_2\}$. The second projection maps Log $10Re1$ on the X-axis, Log $10Re2$ on the Y-axis, and Log $10We2$ on the Z-axis. The three dimensional map of experimental results mapped on the second projection shown in FIG. 5 reveals a sector defined by two intersecting planes where results generally exhibit an undesirable characteristic and are considered to be bad results. The regions defined by $Re_1^2 Re_2 < 10$ and $Re_2 We_2 < 3$ include experiments yielding bad results. The regions $Re_1^2 Re_2 > 10$ or $Re_2 We_2 > 3$ include experiments yielding results with desirable, or good, properties.

Figure 6:
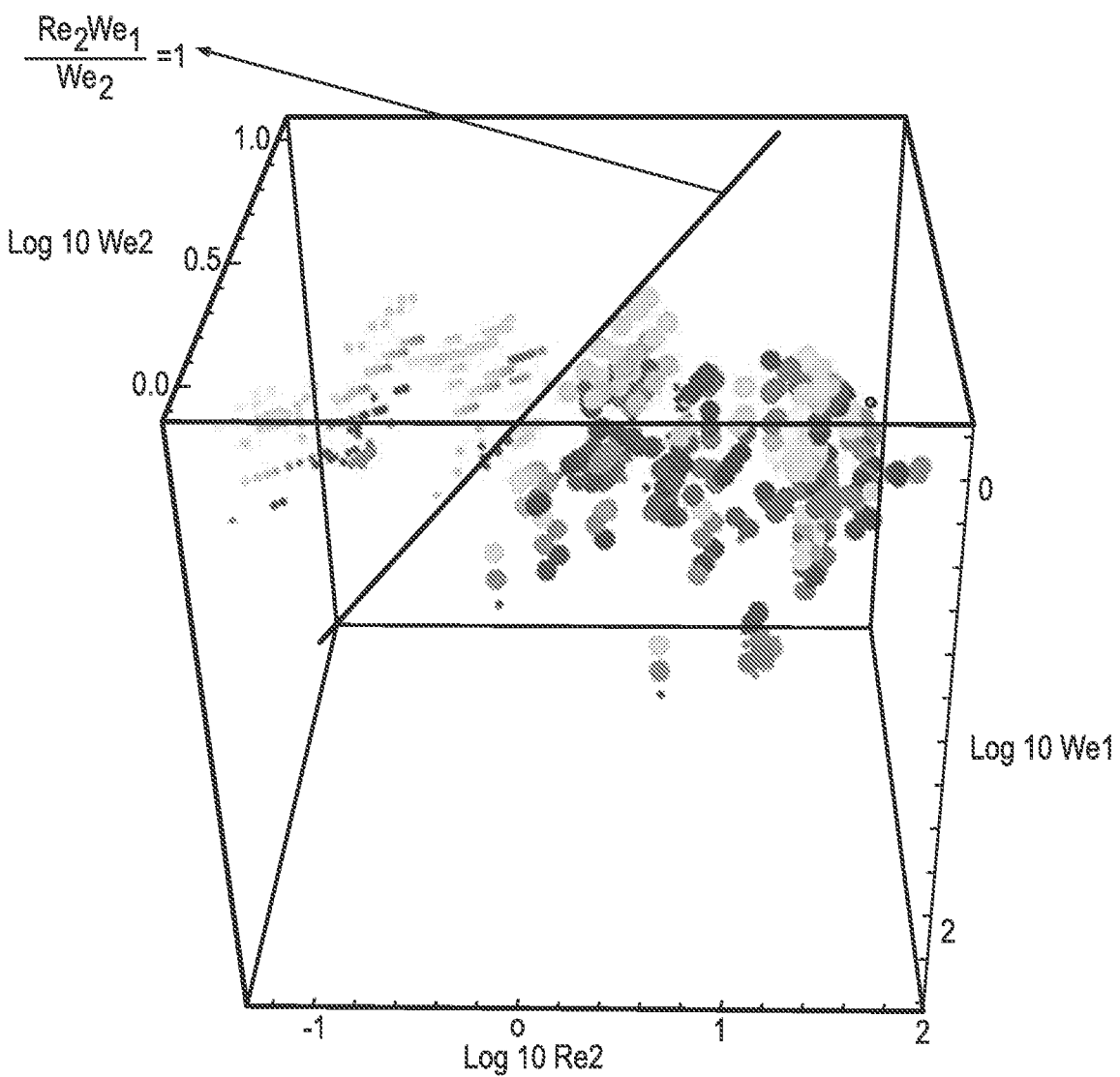
FIG. 6 is a graph showing experimental results mapping relationships between Weber number and Reynolds number in accordance with the present disclosure.

A third projection is shown in FIG. 6. The third projection maps the relationship between the non-dimensional set of control variables including $\{Re_2,We_1,We_2\}$. The third set maps Log $10Re2$ on the X-axis, Log $10We1$ on the Y-axis, and Log $10We2$ on the Z-axis. The three dimensional map of experimental results mapped on the third projection shown in FIG. 6 reveals a sector separated by a single plane that yields bad results. The parametrical range defined by $(Re_2 We_1)/We_2 < 1$ is determined to generally include experimental results having dispersions of encapsulated droplets with undesirable properties, such as being polydisperse, having satellites, having bad performance, having excessive eccentricity, causing dripping during capillary jet formation, or presenting other undesirable faults.

A further study was performed on the experimental results, and it was observed that over 92% of the experimental results falling in the bad, or unacceptable, regions do not yield desirable monodisperse concentric droplets having a geometric standard deviation (GSD) less than 1.35. In some embodiments, monodisperse concentric droplets may be defined as a group of droplets having a geometric standard deviation (GSD) less than about 1.35.

A table is shown in FIG. 7 identifying examples of eight experiments performed, labeled Experiments A, C, D, E, F, G, H, and I. For each experiment, non-dimensional parameters of the set $\{Re_1, Re_2, We_1, We_2\}$ were calculated based on chosen operating conditions and material properties. The resultant encapsulated droplets for each experiment were optically observed and the volume median diameter (VMD) of each particle was measured. Also, the normalized density distribution of particle sizes for each sample was determined.

Figure 8:
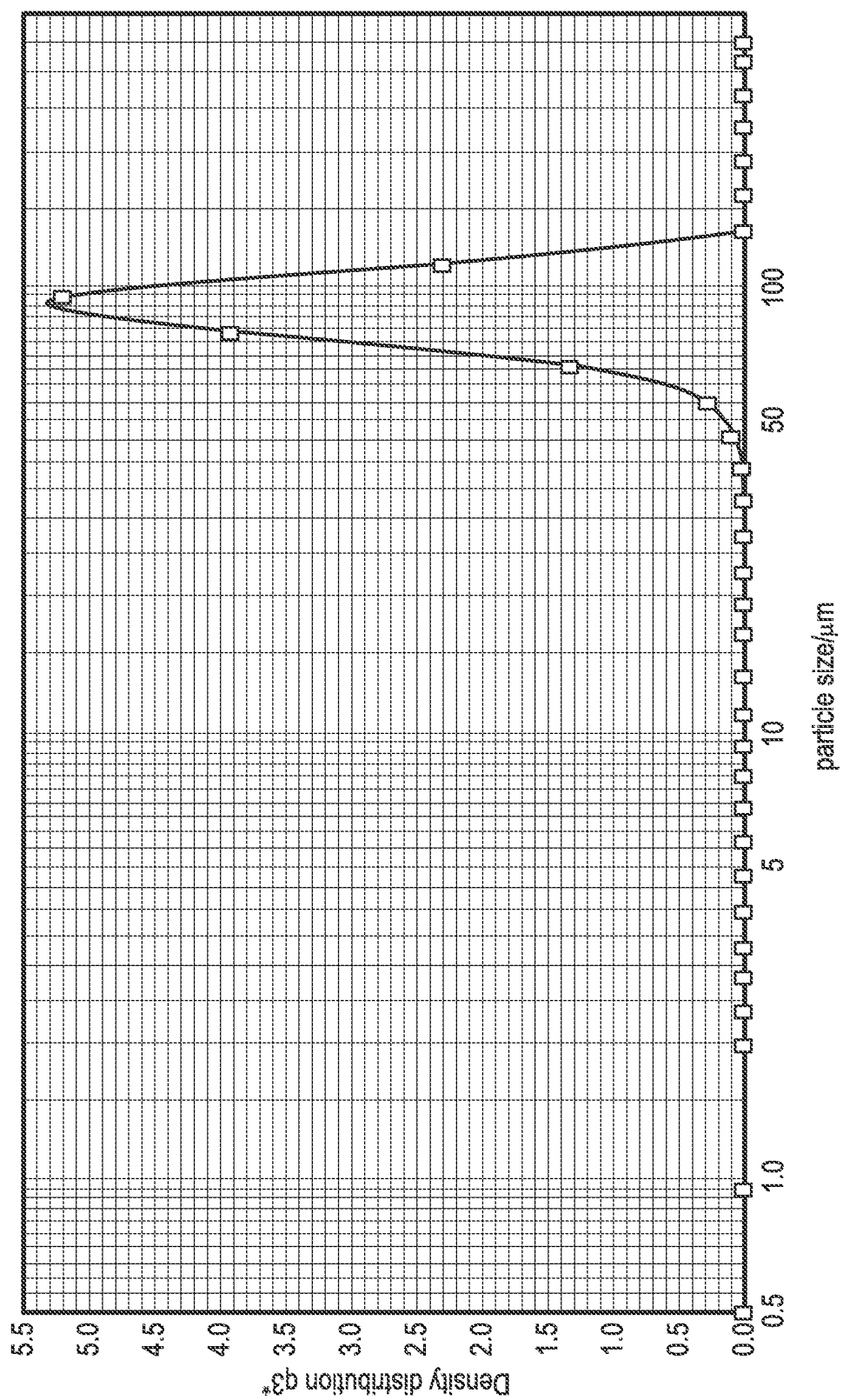
FIG. 8 is a graph showing substantially mono-disperse distribution densities of particles of different sizes produced in accordance with the present disclosure.
Figure 9:
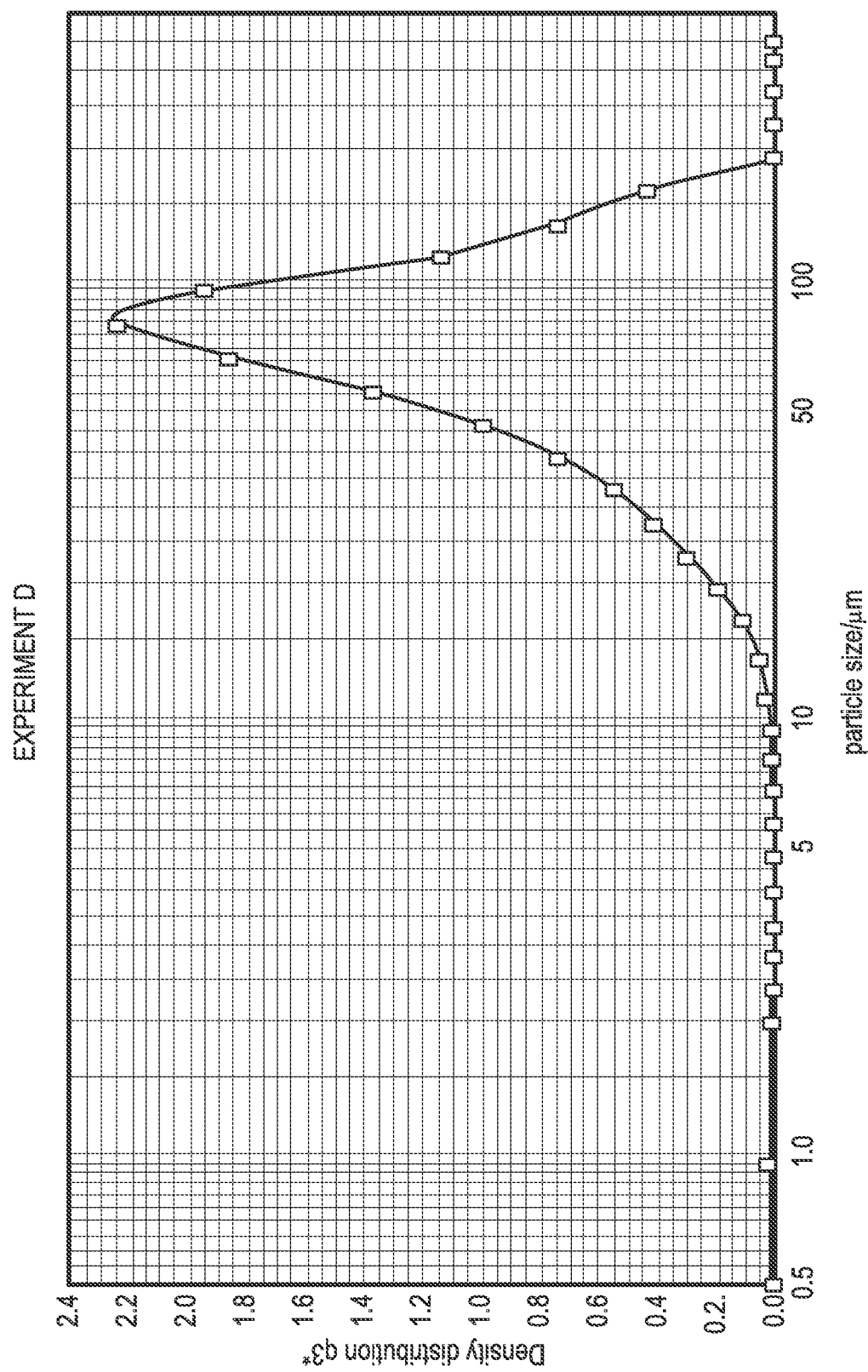
FIG. 9 is a graph showing non-monodisperse distribution densities of particles of different sizes produced in accordance with the present disclosure.

An example of a particle size in microns plotted as a function of density distribution is shown in FIG. 8 for Experiment I. The experimental parameters and calculated non-dimensional values for Experiment I are shown in the table in FIG. 7. This experiment yielded a high density distribution of particles in a relatively narrow range of particle sizes between about fifty microns and about one-hundred microns. This type of result is representative of a desirable monodisperse group of encapsulated droplets or particles. A second example of particle size in microns plotted as a function of density distribution is shown in FIG. 9 for Experiment D. The experimental parameters and calculated non-dimensional values for Experiment D are shown in the table in FIG. 7. This experiment resulted in a broad range of particle sizes with higher density distributions than the results shown in FIG. 8 for Experiment I. The results shown in FIG. 9 for Experiment D represent a bad result yielding a polydisperse group of encapsulated droplets having many different sizes.

A table shown in FIG. 10 relates various regions mapped regions shown on FIGS. 4-6 to homogenous and non-homogenous modes of concentric droplet breakup for experimental Examples A, C, D, E, F, G, H and I. Concentric droplet breakup refers to the stage of droplet formation where a capillary microjet separates into discrete encapsulated droplets due to instability in the liquid downstream of the pressure chamber exit orifice. Examples A and E were identified in the region $Re_2 We_1^{1/4} < 1.2$ as shown in FIG. 4. These examples were characterized by observing non-homogenous modes of concentric droplet breakup. These examples produced bad results that would not be suitable for applications requiring monodispersion characteristics. Similarly, Examples A, C and D were identified in the regions bound by both $Re_1^2 Re_2 < 10$ and $Re_2 We_2 < 3$ as shown in FIG. 5. These examples were also characterized by observing a non-homogenous mode of concentric droplet breakup. These examples also produced bad results that would not be suitable for applications requiring monodispersion characteristics. Additionally, as seen in FIG. 10, Example F was identified in the region $(Re_2 We_1)/We_2 < 1$ as shown in FIG. 6. This example was also characterized by observing a non-homogenous mode of concentric droplet breakup.

Figure 3:
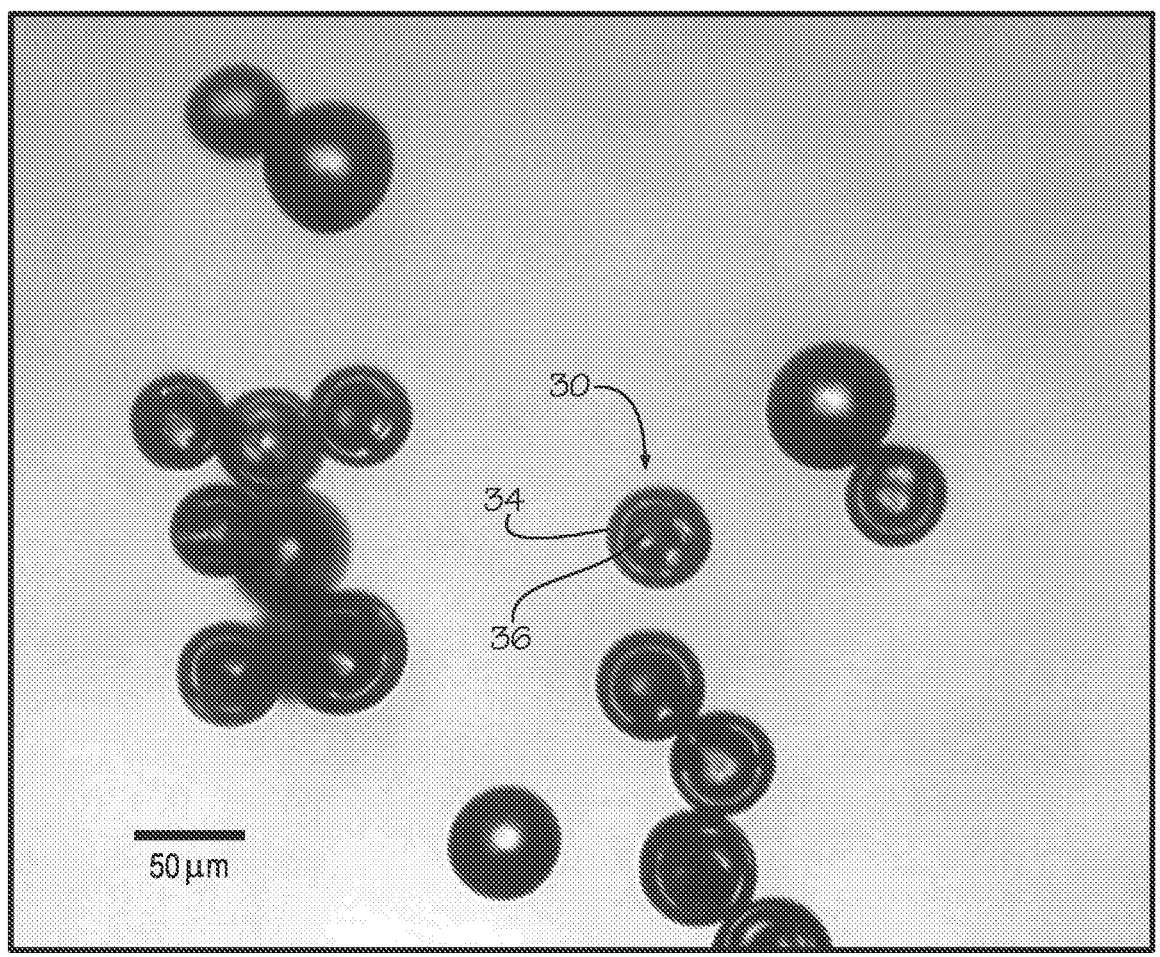
FIG. 3 is a photograph showing embodiments of droplets produced in accordance with the present disclosure.
Figure 11:
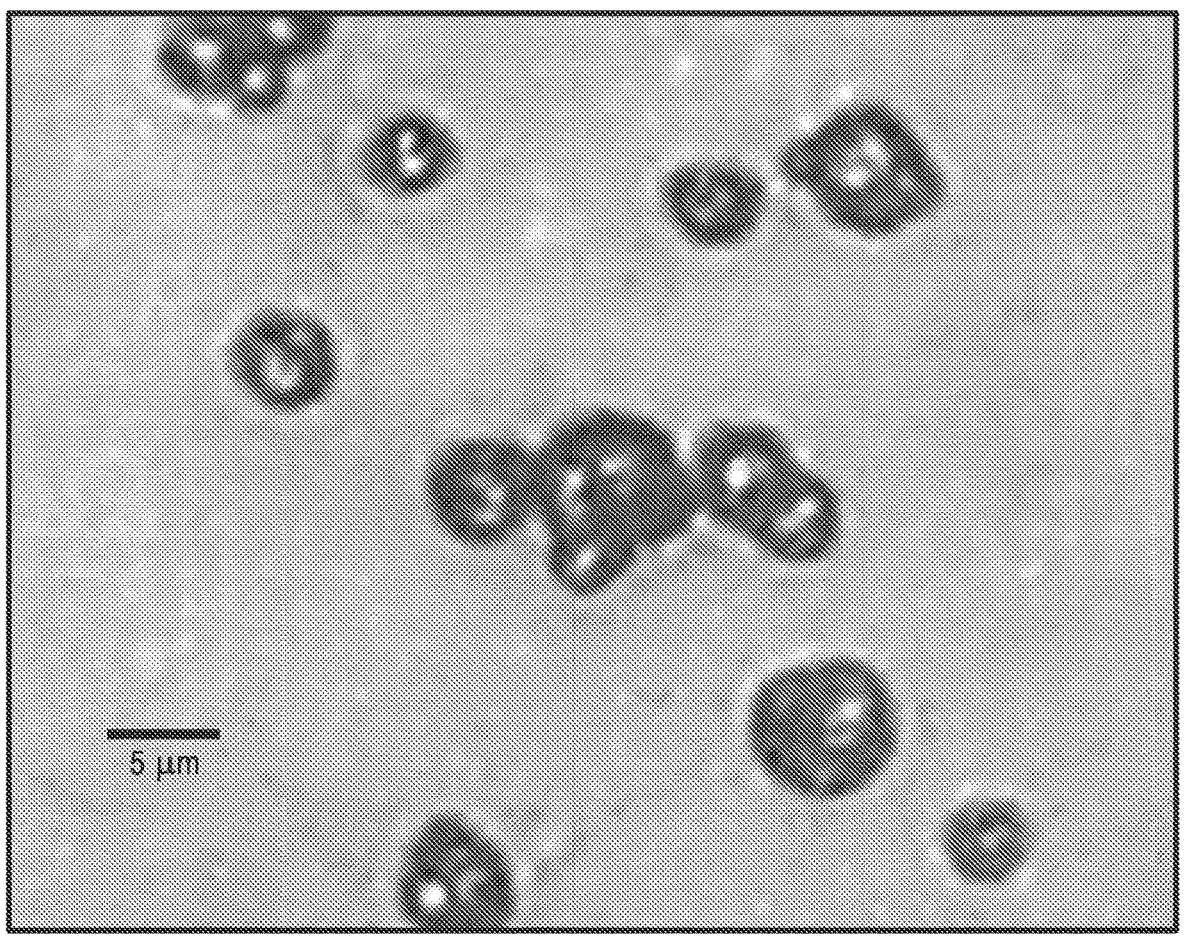
FIG. 11 is a photograph showing embodiments of droplets produced in accordance with the present disclosure.

The table in FIG. 10 also demonstrates that several other regions produce mainly homogenous modes of concentric droplet breakup, and thus do not produce only bad results. In some embodiments, in the non-bad regions, mainly homogenous results are obtained. In some embodiments, about 90% or greater of experiments yield monodisperse droplets in non-bad regions. These include Examples G, H and I. The photograph shown in FIG. 3 includes a group of droplets produced in Experiment I including monodisperse concentric droplets. Notably, the majority of droplets produced in Experiment I shown in FIG. 3 are homogenous. Additionally, the majority of droplets produced in regions identified above are homogenous. However, some non-homogenous droplets were also observed in the regions (i) $Re_2 We_1^{1/4} > 1.2$; (ii) $Re_1^2 Re_2 > 10$ and $Re_2 We_2 > 3$; and (iii) $(Re_2 We_1)/We_2 > 1$. For example, FIG. 11 shows a photograph of droplets produced in experimental Example G, which resulted in mainly homogenous droplet breakup, resulting in monodisperse concentric droplets.

The present disclosure provides a method of producing encapsulated droplets of a first core material surrounded by a second shell material. The method includes the steps of (a) providing a microencapsulation apparatus including a first channel having a first channel exit opening, a second channel having a second channel exit opening positioned around the first channel, and a pressure chamber at least partially surrounding the first and second channel exit openings, wherein the pressure chamber includes a pressure chamber exit orifice downstream of both the first and second channel exit openings; (b) identifying a first group of control parameters associated with undesirable flow regimes in the region:
  (i) $Re_2 We_1^{1/4} < 1.2$, or
  (ii) $Re_1^2 Re_2 < 10$ and $Re_2 We_2 < 3$, or
  (iii) $Re_2 We_1 / We_2 < 1$;
(c) selecting control variables based at least in part on the identified group of control variables of step (b); (d) introducing a first material in the first channel, a second material in the second channel, and a third material in the pressure chamber so the first and second materials form a microjet extending toward the pressure chamber exit orifice; and (e) forming a plurality of encapsulated droplets of the first material surrounded by the second material when the third material is emitted from the pressure chamber exit orifice. In additional embodiments, the present disclosure provides a dispersion of encapsulated droplets or particles produced according to the above-referenced method.

In further embodiments, the present disclosure provides a method of producing encapsulated droplets, comprising the steps of: (a) providing a microencapsulation apparatus including a first channel having a first channel exit opening, a second channel having a second channel exit opening positioned concentrically around the first channel exit opening, and a pressure chamber at least partially surrounding the first and second channel exit openings, wherein the pressure chamber includes a pressure chamber exit orifice downstream of both the first and second channel exit openings; (b) identifying a first group of control parameters associated with desirable flow regimes outside the region:
  (i) $Re_2 We_1^{1/4} < 1.2$, and
  (ii) $Re_1^2 Re_2 < 10$ or $Re_2 We_2 < 3$, and
  (iii) $Re_2 We_1 / We_2 < 1$;
(c) selecting control variables based at least in part on the identified group of control variables of step (b); (d) introducing a first material in the first channel, a second material in the second channel, and a third material in the pressure chamber so the first and second materials form a microjet extending toward the pressure chamber exit orifice; and (e) forming a plurality of encapsulated droplets of the first material surrounded by the second material when the third material is emitted from the pressure chamber exit orifice.

In additional embodiments, the present disclosure provides a dispersion of encapsulated droplets or particles produced according to the above-referenced method.

Figure 12:
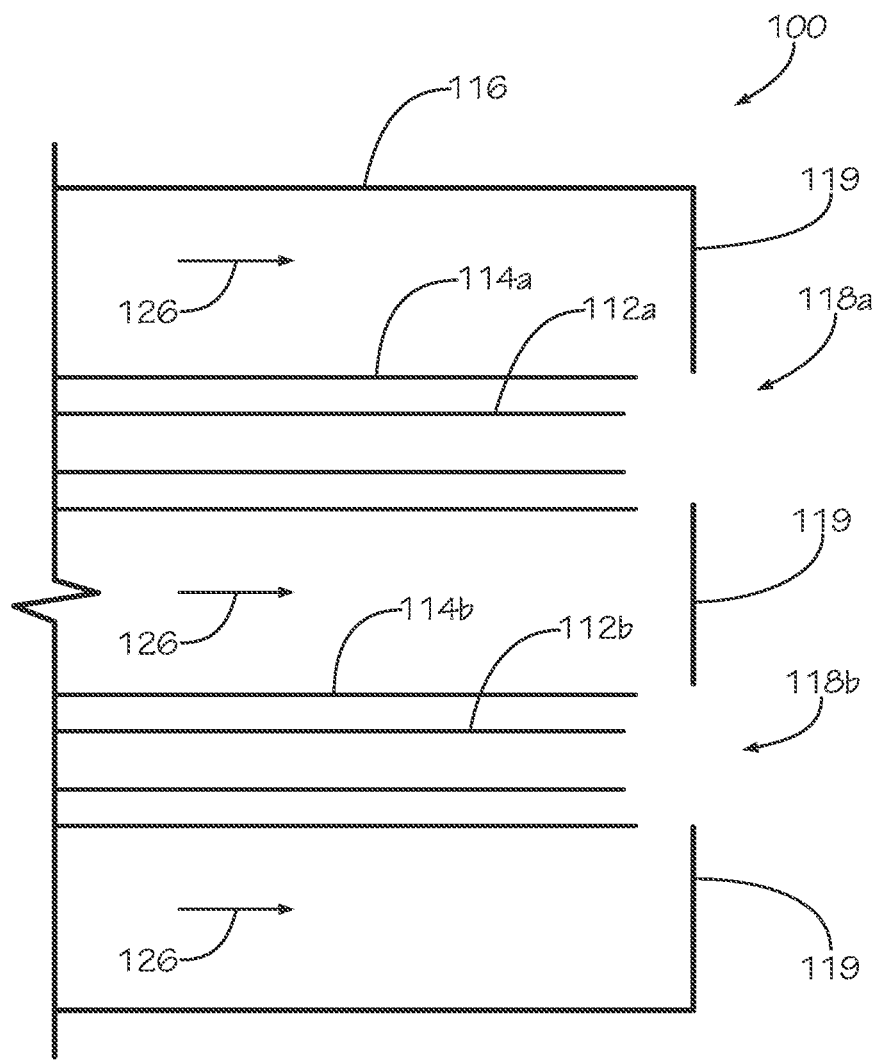
FIG. 12 illustrates a schematic view of an alternative embodiment of an apparatus for producing encapsulated droplets using concentric flow focusing.

Referring further to the drawings, FIG. 12 illustrates an embodiment of microencapsulation apparatus including a plurality of delivery structures positioned to operate in parallel to produce an array of droplets. The apparatus 100 includes a first channel assembly and a second channel assembly. The first channel assembly includes a first inner channel 112a, and a first outer channel 114a. First outer channel 114a is substantially co-axially aligned with first inner channel 112a and surrounds first inner channel 112a in some embodiments. The apparatus also includes a second channel assembly having a second inner channel 112b and a second outer channel 114b. Second outer channel 114b is substantially co-axially aligned with second inner channel 112b and surrounds second inner channel 112b in some embodiments. In various other embodiments, more than two channel assemblies may be provided to produce numerous stable microcapillary jets at the same time.

Referring further to FIG. 12, the first and second channel arrays are positioned in a common pressure chamber 116. The inner and outer channels each terminate at an exit opening spaced from a pressure chamber exit orifice. For example, first inner channel 112a terminates at an exit opening spaced from first pressure chamber exit orifice 118a, and first outer channel 114a terminates at an exit opening spaced from first pressure chamber exit orifice 118a. Fluids traveling from first inner and first outer channels form a first jet that is emitted from the first pressure chamber exit orifice 118a as gas 126 is forced through the pressure chamber and out the first pressure chamber exit orifice. The same principles of operation described above for a single jet apply to each channel assembly and corresponding pressure chamber exit orifice in combination in embodiments such as those shown in FIGS. 12-14 having multiple channel assemblies.

Figure 13:
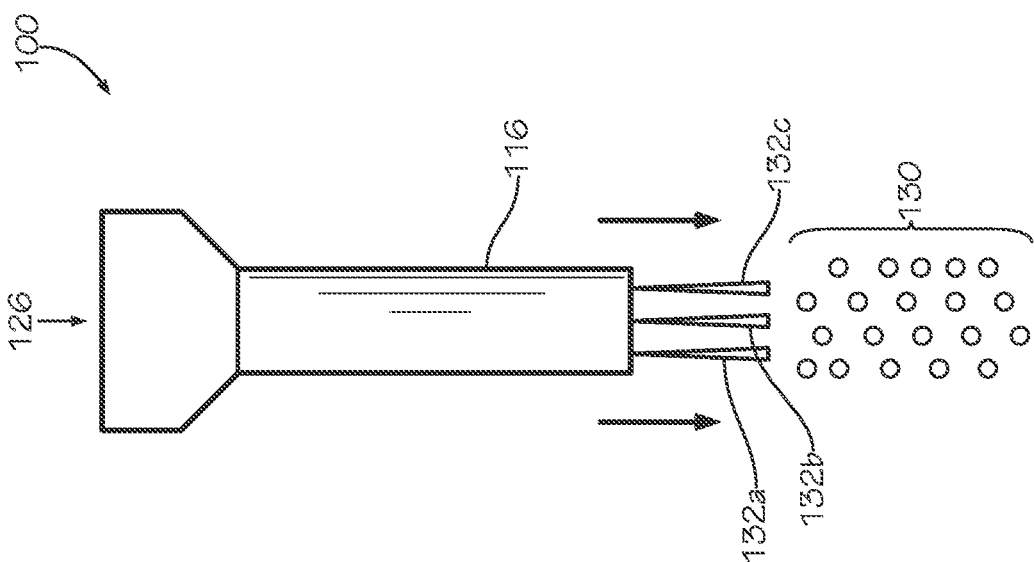
FIG. 13 illustrates a schematic view of an alternative embodiment of an apparatus for producing encapsulated droplets using concentric flow focusing.

As seen in FIG. 12, pressure chamber 116 includes a pressure chamber end wall 119 having multiple pressure chamber exit orifices 118a, 118b, etc. in some embodiments. Referring to FIG. 13, another embodiment of an apparatus for emitting microencapsulated droplets is shown. The apparatus 100 includes a pressure chamber 116 in which an input gas 126 is forced. A plurality of stable microcapillary jets 132a, 132b, 132c, etc. are emitted from the pressure chamber 116 according to the principles described above for single and multiple channel assembly devices. Each jet breaks up into a plurality of droplets 130 downstream of the pressure chamber 116 as described above in relation to a single jet breakup.

Figure 14:
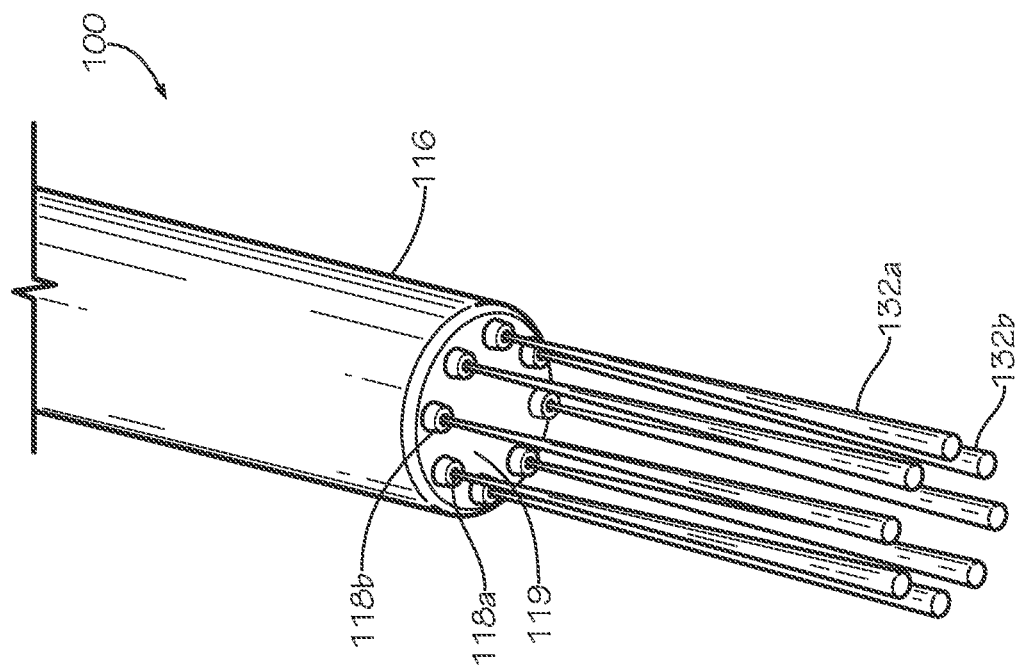
FIG. 14 illustrates a perspective view of an alternative embodiment of an apparatus for producing encapsulated droplets using concentric flow focusing.

Referring to FIG. 14, an alternative embodiment of an apparatus 100 configured to emit a plurality of jets for producing encapsulated droplets is illustrated. Apparatus 100 includes a pressure chamber 116 and a plurality of channel assemblies housed within the pressure chamber, as described above. An array of pressure chamber exit orifices 118a, 118b, etc. are defined in an end wall 119 of pressure chamber 116. A jet of first and second fluids is emitted from each pressure chamber exit orifice. In some embodiments, different materials may be emitted from different orifices on a single device. In other embodiments, each jet includes the same composition.

In further embodiments, apparatus 100 includes an array of independent pressure chambers, with each pressure chamber having its own internal channel assembly, such that the gas flowing through each pressure chamber only directly impacts a jet from one channel assembly.

Thus, although there have been described particular embodiments of the present invention of new and useful concentric capillary encapsulation devices and methods, it is not intended that such references be construed as limitations upon the scope of this invention except as set forth in the following Claims.

What is claimed is:

1. A method of producing encapsulated droplets, comprising the steps of:
    (a) providing a microencapsulation apparatus including a first channel having a first channel exit opening, a second channel having a second channel exit opening positioned concentrically around the first channel exit opening, and a pressure chamber at least partially surrounding the first and the second channel exit openings, wherein the pressure chamber includes a pressure chamber exit orifice downstream of both the first and second channel exit openings;
    (b) identifying a first group of control parameters, comprising:
        $Re_1$: Reynolds number of a first material,
        $Re_2$: Reynolds number of a second material,
        $We_1$: Weber number of the first material,
        $We_2$: Weber number of the second material,
    said parameters being associated with undesirable flow regimes in the region:
        (i) $Re_2 We_1^{1/4} < 1.2$, or
        (ii) $Re_1^2 Re_2 < 10$ and $Re_2 We_2 < 3$, or
        (iii) $Re_2 We_1 / We_2 < 1$;
    (c) selecting control variables, based at least in part on the identified group of control variables of step (b);
    (d) introducing the first material in the first channel, the second material in the second channel, and a third material in the pressure chamber so the first and second materials form a microjet extending toward the pressure chamber exit orifice; and
    (e) forming a plurality of encapsulated droplets of the first material surrounded by the second material when the third material is emitted from the pressure chamber exit orifice.

2. The method of claim 1, wherein the third material comprises a gas.

3. The method of claim 2, wherein the first material comprises a liquid.

4. The method of claim 3, wherein the second material comprises a liquid.

5. The method of claim 1, wherein the first material comprises a solid.

6. The method of claim 5, wherein the second material comprises a liquid.

7. The method of claim 1, wherein the first channel exit opening is axially offset from the second channel exit opening in the axial direction toward the pressure chamber exit orifice.

8. The method of claim 1, wherein the first channel exit opening is axially offset from the second channel exit opening in the axial direction away from the pressure chamber exit orifice.

9. A method of producing encapsulated droplets, comprising the steps of:

(a) providing a microencapsulation apparatus including a first channel having a first channel exit opening, a second channel having a second channel exit opening positioned concentrically around the first channel exit opening, and a pressure chamber at least partially surrounding the first and the second channel exit openings, wherein the pressure chamber includes a pressure chamber exit orifice downstream of both the first and second channel exit openings;

(b) identifying a first group of control parameters, comprising:

$Re_1$: Reynolds number of a first material, $Re_2$: Reynolds number of a second material, $We_1$: Weber number of the first material,
$We_2$: Weber number of the second material,
said parameters being associated with undesirable flow regimes in the region:
(i) $Re_2 We_1^{1/4} < 1.2$, and
(ii) $Re_1^2 Re_2 < 10$ and $Re_2 We_2 < 3$, and
(iii) $Re_2 We_1 / We_2 < 1$;
(c) selecting control variables, based at least in part on the identified group of control variables of step (b);
(d) introducing the first material in the first channel, the second material in the second channel, and a third material in the pressure chamber so the first and second materials form a microjet extending toward the pressure chamber exit orifice; and
(e) forming a plurality of encapsulated droplets of the first material surrounded by the second material when the third material is emitted from the pressure chamber exit orifice.

10. The method of claim 9, wherein the third material comprises a gas.

11. The method of claim 10, wherein the first material comprises a liquid.

12. The method of claim 11, wherein the second material comprises a liquid.

13. The method of claim 9, wherein the first material comprises a solid.

14. The method of claim 9, wherein the first channel exit opening is axially offset from the second channel exit opening in the axial direction toward the pressure chamber exit orifice.

15. The method of claim 9, wherein the first channel exit opening is axially offset from the second channel exit opening in the axial direction away from the pressure chamber exit orifice.

* * * * *